United States Patent
Thames et al.

(10) Patent No.: US 6,399,673 B1
(45) Date of Patent: Jun. 4, 2002

(54) PHOTOCURABLE ACRYLATED CHLORINATED RUBBER COATINGS

(75) Inventors: Shelby Freland Thames, Hattiesburg, MS (US); Zhiqiang Alex He, Norwalk, CT (US)

(73) Assignee: University of Southern Mississippi, Hattiesburg, MS (US)

(*) Notice: Subject to any disclaimer, the term of this patent is extended or adjusted under 35 U.S.C. 154(b) by 0 days.

(21) Appl. No.: 08/444,534

(22) Filed: May 19, 1995

Related U.S. Application Data

(63) Continuation of application No. 08/132,136, filed on Oct. 5, 1993, now abandoned.

(51) Int. Cl.[7] .......................... C08C 19/36; C08F 14/08
(52) U.S. Cl. ...................... 522/182; 525/292; 525/302
(58) Field of Search .............................. 525/292, 302, 525/303; 522/149, 150, 159, 178, 182

(56) References Cited

U.S. PATENT DOCUMENTS 3,892,884 A * 7/1975 Garratt et al. ................. 427/36
4,439,587 A * 3/1984 Martinez ...................... 525/292

OTHER PUBLICATIONS

Singh, Y.P. and Singh, R.P., "Thermal Stability of PVC/Chlororubber–20–Graft Polyblend–Styrene–Acrylonitrile Blends. I", Journal of Applied Polymer Science, vol. 29, 1984, pp. 1297–1308.

Makani, Siku, et al., "Chemical Modification of Chlorinated Rubbers.II. Study of Chlorinated Natural Rubber Modified by Amino–Esters", Journal of Applied Polymer Science, vol. 29, 1984, pp. 4091–4106.

Anbazhagan, K., et al., "Study of Mechanical Properties of Urethane–Chlorinated Rubber Graft Copolymer System. I", Journal of Applied Polymer Science, 1985, pp. 391–400.

Anbazhagan, K., et al., "Thermal Properties of Polyurethanes Cross–linked with Chlorinated Rubber Graft Copolymers", Polymer Degradation and Stability 15, 1986, pp. 109–123.

Kim, Young H., et al., "Hydroxylation of Polyisoprene via Addition of Haloacetic Acids to the Double Bond", Macromolecules, 1991, pp. 6505–6511.

Marechal, E., "Chemical Modifications of Chlorinated Polymers," IUPAC Macromolecules, Eds. H. Benoit and P. Remp, Pergamon, New York, 1982, pp. 85–97.

Nogues, P., et al., "Graft Copolymerization of Methyl Methacrylate on Chlorinated Natural Rubber, 1 Initiation by Various Organometallic Complexes", Makromol. Chem., 1981, pp. 843–851.

Nogues, Pierre, et al., "Graft Copolymerization of Methyl Methacrylate on Chlorinated Natural Rubber, 2[a)] Initiation by Tetrakis(trialkyl–phosphite)nickel", Makromol. Chem., 1981, pp. 3481–3489.

Nogues, P., et al., "Graft Copolymerization of Methyl Methacrylate on Chlorinated Natural Rubber, 3[a)] Study of the Interaction between Chlorinated and Organometalic Compounds", Makromol. Chem., 1982, pp. 549–555.

"Surface Coatings Science & Technology", Paul Wiley & Sons 1985, pp. 248–260.

Sankholkar, S., et al., "Grafting. III. Copolymerization of Methyl Methacrylate and Methacrylic Acid", J. App. Polymer Sci., 1990, pp. 1681–1688.

Deb, P.C., et al., "Grafting. IV. Graft Tercopolymers as Antifouling Resin", J. App. Polymer Sci., 1991, pp. 1007–1010.

Thames, Shelby F., et al., "The Synthesis and Characterization of Chlorinated Rubber from Low Molecular Weight Guayule Rubber", Agricultural and Synthetic Polymers: Utilization and Biodegradability, ACS Symposium Series 433, 1990, Chapter 20, pp. 230–241.

Thames, Shelby F., et al., "Recent Advances in Guayule Coproduct Research", Guayule Natural Rubber, Whitworth, J. W. et al., Eds., 1991, Chapter 13, pp. 311–350.

Thames, Shelby F., et al., Environmentally Compliant High Solids Chlorinated Rubber Coatings, Water–Borne, High Solids, and Powder Coatings Symposium, Feb. 24–26, 1993, pp. 284–301.

Thames, S. F., et al., "The Modification of Secondary High Molecular Weight Guayule Rubber with Metachloroperoxybenzoic Acid", Journal of Applied Polymer Science, vol. 47, 1993, pp. 1255–1262.

Trivedi, B. C. et al., "Maleic Anhydride", Plenum Press, New York, p. 466.

Brydson, J. A., "Rubber Chemistry", Applied Science Publishers Ltd., pp. 178–179.

Thames, Shelby F., et al., "Environmentally Friendly Functionalized Chlorinated Rubber Coatings", Poster presented in FSCT Annual Meeting and Paint Industries' Show, Oct. 23–25, 1992, Chicago, IL.

Thames, Shelby F., et al., "Functionalized Chlorinated Low Molecular Weight Guayule Rubber in Environmentally Compatible Coatings", Poster presented at Biobased Products' Expo. 92, Oct. 7–9, 1992, St. Louis.

Burlant, W., "The Basics of Radiation Curing," Industrial Finishing, May 1992, pp. 16, 19 and 30.

De Monte, A.P., "Enhancing Coatings Properties," Paint & Coatings Industry, Jun. 1993, pp. 50–52.

Hoyle, C.E., "Photocurable Coatings," Radiation Curing of Polymeric Materials, Ed., Hoyle and Kinstle, ACS Series 417, 1990, pp. 1–15.

* cited by examiner

*Primary Examiner*—Paul Thibodeau
*Assistant Examiner*—D. Lawrence Tarazano
(74) *Attorney, Agent, or Firm*—Howrey Simon Arnold & White, LLP

(57) ABSTRACT

The invention relates to acrylated chlorinated rubber, a method for making acrylated chlorinated rubber comprising reacting chlorinated hydroxyrubber and acryloyl chloride with triethylamine as a catalyst, and photocurable rubber coatings comprising acrylated chlorinated rubber.

19 Claims, No Drawings

PHOTOCURABLE ACRYLATED CHLORINATED RUBBER COATINGS

This application is a continuation of application Ser. No. 08/132,136, filed Oct. 5, 1993, now abandoned.

This invention was made with government support under Contract No. 89-38200-4372 awarded by the United States Department of Agriculture. The government has certain rights in the invention.

BACKGROUND OF THE INVENTION

1. Field of the Invention

The present invention relates generally to acrylated chlorinated rubber, a method for making acrylated chlorinated rubber, and environmentally friendly photocurable rubber coatings comprising acrylated chlorinated rubber.

2. Background

Chlorination of cis-polyisoprene is a well established industrial process to produce chlorinated rubber. See, e.g., British Patent No. 381,038 (1859) and U.S. Pat. No. 1,234,381 (1912). Chlorinated rubber has long been used in surface coatings to provide abrasion resistance, chemical and water resistance, flame retardance, durability and toughness. It is one of the best anticorrosive binders widely used in hostile environments such as marine coatings, swimming pool coatings and traffic paints.

Chlorinated rubber, however, is a non-convertible or nonreactive binder. That is, chlorinated rubber does not alter its structure or react with other ingredients in the coating composition during curing. Thus its applications have been limited to solvent based coatings of high volatile organic content ("VOC"). Such coatings are cured exclusively by solvent evaporation, which causes air pollution. Although still allowed, high VOC coatings have been largely replaced by new technologies such as water borne, high solids, and powder coatings in response to stringent legislative regulatory requirements.

Chlorinated rubber coatings suffer from a further problem of poor solvent resistance due to lack of crosslinking between the chlorinated rubber binder and the solvents or diluents used in the coating compositions.

These problems associated with chlorinated rubber coatings have existed since chlorinated rubber was first utilized in the coatings industry approximately fifty years ago. They have become more serious since the Environmental Protection Agency began in 1967 to regulate VOC levels in coatings and they will become even more serious as more and more stringent environmental regulations take effect in the future.

A need therefore exists for a functionalized chlorinated rubber that will act as a convertible binder, i.e., a reactive binder, in coating applications, thereby reducing VOC levels, and that will impart improved solvent resistance to coating formulations.

Functionalization, or chemical modification, of chlorinated rubber has been a topic of extensive studies in recent years. Most of the studies have used direct modifications of chlorinated rubber, such as free radical initialized graft copolymerization with a variety of functional acrylate or styrene monomers. Direct modifications of chlorinated rubber are limited, however, due to its chemical inertness and thermal instability. Moreover, unwanted side reactions such as polycondensation and elimination are unavoidable.

Hydroxylation of rubber via. saponification of the reaction adduct of rubber and haloacetic acids has been recently reported. Y. H. Kim and A. Pandya, *Macromolecules*, 24, 6505–11 (1991). However, the commercial value of the product, partially hydroxylated rubber, also known as hydroxyrubber, was not assessed, nor were coating applications mentioned, since hydroxyrubber does not possess properties necessary for coating grade materials.

It has now been discovered that acrylated chlorinated rubber provides outstanding properties in coating applications and makes possible the formulation of 100% solids photocurable rubber coatings.

SUMMARY OF THE INVENTION

In accordance with one aspect of the present invention, there is provided a composition comprising acrylated chlorinated hydroxyrubber.

In accordance with another aspect of the present invention there is provided a method for making acrylated chlorinated rubber. The method comprises reacting chlorinated hydroxyrubber and acryloyl chloride with triethylamine as a catalyst. The rubber which can be utilized includes masticated natural rubber, masticated synthetic rubber, low molecular weight natural rubber, and low molecular weight guayule rubber ("LMWGR"). The hydroxyl and chlorine content of the chlorinated hydroxyrubber can be altered by varying the reaction times. No unwanted side reactions have been noted.

In accordance with yet another aspect of the present invention, there are a method of making and formulations for photocurable rubber coatings comprising acrylated chlorinated rubber.

Acrylated chlorinated rubber prepared by the method of the present invention provides improved properties when compared to conventional chlorinated rubber and when compared to chlorinated hydroxyrubber. Acrylated chlorinated rubber is a convertible binder, and, thus, allows crosslinkable reactive solvents or diluents to be utilized in coatings formulations, so that the solids content of the coatings will be increased. Because acrylated chlorinated rubber can be formulated into 100% solids coatings and cured by radiation induced free radical polymerization, the reactive solvents or diluents become part of the coating and, therefore, cause no air pollution. Acrylated chlorinated rubber also imparts excellent solvent resistance to coatings formulations because of the crosslinking of reactive diluents and the functional groups of the chlorinated rubber. In addition, the incorporation of acrylated chlorinated rubber in coatings imparts superior adhesion, sanding, and hardness properties.

Acrylated chlorinated rubber can be used in coatings, printing inks and adhesives. Photocurable acrylated chlorinated rubber coatings typically comprise a functionalized prepolymer, reactive diluents, photoinitiators and various additives. Formulation examples and coating properties of 100% solids coatings comprising acrylated chlorinated rubber are provided.

Other features and advantages of the present invention will become apparent from the following detailed description, which is given by way of illustration only.

DETAILED DESCRIPTION OF THE INVENTION

There is provided a composition comprising acrylated chlorinated hydroxyrubber.

There is also provided a method for making acrylated chlorinated rubber comprising reacting chlorinated hydroxyrubber and acryloyl chloride with triethylamine as a catalyst.

The hydroxyrubber is prepared by saponification of the reaction adduct of rubber and trichloroacetic acid without isolation of the adduct. The hydroxyl content of the hydroxyrubber can be controlled by varying the reaction time between the rubber and trichloroacetic acid.

The rubber which can be utilized includes masticated natural rubber, masticated synthetic rubber, low molecular weight natural rubber, i.e., rubber having a molecular weight less than about 200,000, and low molecular weight guayule rubber.

Chlorinated hydroxyrubber is prepared by chlorinating the hydroxyrubber with chlorine gas. The partially hydroxylated rubber is dissolved in chloroform. After purging the reaction system with nitrogen gas, chlorine gas is introduced into the reaction system. The solution is allowed to reflux with constant agitation. After the reaction is completed, chlorinated hydroxyrubber is precipitated with methanol.

Acrylated chlorinated hydroxyrubber is than prepared by reacting chlorinated hydroxyrubber and acryloyl chloride with triethylamine as a catalyst. The method comprises the steps of dissolving chlorinated hydroxyrubber in anhydrous toluene in a reaction vessel equipped with a nitrogen inlet tube, adding acryloyl chloride to the chlorinated hydroxyrubber solution, stirring the mixture of acryloyl chloride and chlorinated hydroxyrubber under a slow nitrogen flow, adding a solution of triethylamine in anhydrous toluene to the mixture, and precipitating the product, acrylated chlorinated rubber, with methanol. The acrylated chlorinated rubber is further purified by dissolving it in methylene chloride and precipitating it with methanol.

The method according to the present invention will be further described by the following non-limiting example.

EXAMPLE 1

Rubber Sources:

Liquid natural rubber, DPR-40 and DPR-400, was provided by Hardman Inc. and purified by dissolution in methylene chloride followed by precipitation from methanol. The numbers following the product designation indicate the viscosity of the rubber. For example, DPR-40 has a viscosity of 40,000 centipoise at 100° F. Low molecular weight guayule rubber was isolated from guayule resin supplied by Bridgestone/Firestone Inc.

Synthesis of Hydroxyrubbers

Hydroxyrubber derived from the different rubber sources, DPR-40, DPR-400, and low molecular weight guayule rubber, was synthesized as follows.

To 350 mL of 5% (w/w) rubber in anhydrous toluene in a 500 mL Erlenmeyer flask was added 56.8 g of trichloroacetic acid. The solution was stirred for 23 hours at 0° C. under $N_2$ atmosphere. The solution was poured into a 1000 mL Erlenmeyer flask containing 60.7 g of sodium methoxide and 100 mL of methanol. After the mixture was continuously stirred for 20 hours, 34.7 mL of acetic acid was added to neutralize the mixture. The mixture was stirred for an additional 15 minutes after which it was poured into 650 mL of methanol and the pH adjusted to 5–6 with a few drops of acetic acid. The product was precipitated, washed with methanol and 50% (v/v) methanol in water, and dried in a vacuum oven. Additional purification of the hydroxyrubber was accomplished by dissolving in 100 mL methylene chloride and precipitating via the addition of 400 mL of methanol.

Synthesis of Chlorinated Hydroxyrubbers

Chlorinated hydroxyrubber derived from the different rubber sources was synthesized as follows.

A solution of 5% (w/w) hydroxyrubber prepared above in $CHCl_3$ (280 mL) was added to a three neck flask fitted with a water condenser, gas inlet tube and a glass stopper. The inlet tube was connected via Teflon tubes, through a gas trap, to a chlorine cylinder. The exit port of the condenser was connected to two traps filled with concentrated sodium hydroxide. The reaction flask was immersed in an oil bath for temperature control. Nitrogen was purged through the system for more than 15 minutes before introducing chlorine gas. The solution was allowed to reflux with constant agitation via a magnetic stirrer. A slight excess of chlorine was delivered into the reaction vessel while the liberated hydrogen chloride was trapped in the sodium hydroxide solutions. The product was precipitated with 600 mL methanol after the reaction was completed. The chlorination was confirmed by the C—Cl absorption at 758 $cm^{-1}$ in Fourier transfer infrared spectra (FTIR) and by elemental analysis. The presence of hydroxyl groups are evidenced by the O—H absorption peak in the range of 3400–3600 $cm^{-1}$ in FTIR.

Synthesis of Acrylated Chlorinated Rubbers

Acrylated chlorinated hydroxyrubber derived from the different rubber sources was synthesized as follows.

To a solution of 11.0 g of chlorinated hydroxyrubber in 150 mL of anhydrous toluene in a 500 mL three neck flask, equipped with a nitrogen inlet tube, a water condenser and a dropping funnel, was added 2.178 g of acryloyl chloride. The mixture was stirred at 70° C. under a slow $N_2$ flow. A solution of 2.450 g of triethylamine in 50 mL of anhydrous toluene was added dropwise in a one hour period after which the reaction was continued for 2 additional hours. The product was precipitated with 800 mL of methanol. The slight yellowish product was dried and further purified by dissolving in methylene chloride and precipitating from methanol. The completion of. the acrylation was evidenced by the complete disappearance of hydroxyl absorption band and the appearance of characteristic acrylics group absorptions in Fourier transfer infrared spectroscopy. The properties of the acrylated chlorinated rubbers are shown in Table 1.

TABLE 1

| Properties of Acrylated Chlorinated Rubber ("ACR") | | | |
| --- | --- | --- | --- |
| ACR | DPR-40 | DPR-400 | LMWGR |
| Cl content (Wt) | 44.5% | 46.5% | 46.4% |
| Acryl content (Wt) | 7.1% | 6.8% | 7.0% |
| Tg ° C. | 83.9 | 83.9 | 77.9 |

Acrylated chlorinated rubber can be utilized in a wide variety of coatings to meet various requirements of different uses, including wood fillers and clear finishes.

100% solids coatings are formulated by dissolving acrylated chlorinated rubber in acrylated monomers. The acrylated monomers which can be used in the coatings include monofunctional, difunctional and trifunctional acrylated monomers, such as the Photomer series from Henkel.

The hardness and flexibility of acrylated chlorinated rubber coatings can be adjusted by carefully choosing the reactive diluents. Increasing the amount of trifunctional diluents in the coating formulation gives high crosslinking density, and thus leads to higher hardness but less flexibility. Coatings comprising acrylated chlorinated rubber from different rubber sources show similar coating properties, except coatings from a DPR-40 rubber source have lower viscosity. The slightly yellow color from some impurities in the original rubber lends very attractive color to the coatings. No extra stain is needed.

Coating formulations comprising acrylated chlorinated rubber according to the present invention will be further described by the following non-limiting example.

EXAMPLE 2

Typical formulations of 100% solids photocurable acrylated chlorinated rubber wood filler,are listed in Table 2.

The coating compositions were prepared by mixing together acrylated chlorinated rubber, pigment, additives, photoinitiators, and reactive diluents and grinding for 1 hour to Hegman 7.5 with a high speed mixer at 1500 rpm. The coatings were applied on sanded maple wood with a draw bar at wet thickness of 2 mils. The coated samples were cured with a 200 Watt/inch ultraviolet curing unit for less than 60 seconds. All the properties of the coatings were examined with ASTM standard methods.

TABLE 2

Formulations (in grams) and Properties of 100% solids photocurable acrylated chlorinated ("AC") rubber wood filler.

| Formulation No. | 1 | 2 | 3 | Suppliers |
|---|---|---|---|---|
| AC DPR-40 | 20.0 | | | USM |
| AC DPR-400 | | 15.8 | | USM |
| AC LMWGR | | | 15.8 | USM |
| Photomer 4061 | 50.0 | 50.0 | 50.0 | Henkel |
| Photomer 4094 | 20.0 | 20.0 | 20.0 | Henkel |
| Photomer 4770 | 5.0 | 5.0 | 5.0 | Henkel |
| Byk 065 | 0.7 | 0.7 | 0.7 | Byk |
| DisperByk 163 | 2.5 | 2.5 | 2.5 | Byk |
| Microwhite 50 | 30.0 | 30.0 | 30.0 | E.C.C. |
| Irgacure 651 | 1.0 | 1.0 | 1.0 | Ciba-Geigy |
| Benzophenone | 2.0 | 2.0 | 2.0 | Dainippon |
| Properties: | | | | ASTM Method # |
| Viscosity @ 25° C. | | | | |
| (cps) | 4020 | 4460 | 5300 | |
| Wet thickness | 2 mils | 2 mils | 2 mils | |
| Adhesion | 5B | 5B | 5B | D-3359 |
| Pencil Hardness | 5H | 5H | 5H | D-3363 |
| Tensile strength | | | | |
| (Kpsi) | 4.8 | 4.3 | 4.5 | D-2370 |
| Elongation | 7% | 8% | 8% | D-2370 |
| MEK double rub | 500+ | 500+ | 500+ | D-4752 |
| 8 hour spot tests: | | | | D-1308 |
| Water | 5 | 5 | 5 | |
| Conc. NH$_4$OH | 4 | 4 | 4 | |
| 10% NaOH | 4 | 4 | 4 | |
| 20% H$_2$SO$_4$ | 5 | 5 | 5 | |

Ground to Hegman 7.5 with a high speed mixer at 1500 rpm for 1 hr.
5 = no effect
4 = stain only
3 = blistering
2 = lifted film
1 = failure

EXAMPLE 3

Typical formulations of 100% solids photocurable acrylated chlorinated rubber wood finishes are listed in Table 3.

The coating compositions were prepared by dissolving acrylated chlorinated rubber, photoinitiators, and additives in an acrylate monomer mixture. The photoinitiators used in the formulations of this Example are Irgacure 651 and benzophenone. The additives used in the formulations of this Example include surface active agents (Byk 065 and Disper Byk 163) and a calcium carbonate based extender pigment (Microwhite 50) which provides bulk or volume. The coatings were applied with a draw bar at wet thickness of 1 mil onto the sanding sealer surface. The coating was then irradiated for less than 60 seconds with a 200 Watt/inch ultraviolet curing unit. All the tests were accomplished according to ASTM standard methods.

TABLE 3

Formulations (in grams) and Properties of 100% solids photocurable acrylated chlorinated ("AC") rubber wood finishes.

| Formulation No. | 1 | 2 | 3 | Suppliers |
|---|---|---|---|---|
| AC DPR-40 | 26.1 | | | USM |
| AC DPR-400 | | 22.0 | | USM |
| AC LMWGR | | | 22.0 | USM |
| Photomer 4127 | 20.0 | 20.0 | 20.0 | Henkel |
| Photomer 4061 | 20.0 | 20.0 | 20.0 | Henkel |
| Photomer 4094 | 30.0 | 30.0 | 30.0 | Henkel |
| Photomer 4149 | 6.0 | 6.0 | 6.0 | Henkel |
| Photomer 4770 | 10.0 | 10.0 | 10.0 | Henkel |
| Byk 065 | 0.7 | 0.7 | 0.7 | Byk |
| Byk 325 | 1.5 | 1.5 | 1.5 | Byk |
| Irgacure 651 | 2.0 | 2.0 | 2.0 | Ciba-Geigy |
| Benzophenone | 2.0 | 2.0 | 2.0 | Dainippon |
| Properties: | | | | ASTM Method # |
| Viscosity @25° C. | | | | |
| (cps) | 2350 | 2970 | 3660 | |
| Wet thickness | 1 mil | 1 mil | 1 mil | |
| Adhesion | 5B | 5B | 5B | D-3359 |
| Pencil hardness | 4H | 4H | 4H | D-3363 |
| Tensile strength | | | | |
| (Kpsi) | 3.6 | 3.5 | 3.9 | D-2370 |
| Elongation | 6% | 7% | 7% | D-2370 |
| 60° gloss | 81 | 80 | 85 | |
| MEK (double rub) | 500+ | 500+ | 500+ | D-4752 |
| 8 hour spot tests: | | | | D-1308 |
| Water | 5 | 5 | 5 | |
| Conc. NH$_4$OH | 4 | 4 | 4 | |
| 10% NaOH | 4 | 4 | 4 | |
| 20% H$_2$SO$_4$ | 5 | 5 | 5 | |

5 = no effect
4 = stains only
3 = blistering
2 = lifted film
1 = failure

100% solids photocurable acrylated chlorinated rubber coatings show excellent adhesion, as well as good chemical, water and solvent resistance. Moreover, the fillers have good sanding properties. UV cured acrylated chlorinated rubber wood finishes are attractive, high gloss, smooth and hard with the added qualities of excellent adhesion and extremely good water and solvent resistance.

While the foregoing detailed description has been directed to particular embodiments of the invention for the purpose of illustration and explanation, it will be apparent to those skilled in the art that modifications and variations in the method and coating compositions set forth can be effected within the scope and spirit of the invention. For example, alterations in the composition of the coating formulations will affect coating properties. Thus compositional variations can be used to formulate a variety of coatings for different applications with concomitant changes in physical and chemical properties.

What is claimed is:

1. A composition comprising acrylated chlorinated rubber containing acrylic ester functional groups.

2. The composition according to claim 1 wherein said acrylated chlorinated rubber is obtained by reacting chlorinated hydroxyrubber and acryloyl chloride with a triethylamine catalyst.

3. A method of making acrylated chlorinated rubber comprising reacting chlorinated hydroxyrubber and acryloyl chloride with a triethylamine catalyst.

4. The method according to claim 3 wherein said chlorinated hydroxyrubber is obtained by reacting hydroxyrubber with chlorine gas.

5. The method according to claim 4 wherein said hydroxyrubber is obtained by saponification of the reaction adduct of rubber and trichloroacetic acid without isolation of the adduct.

6. The method according to claim 5 wherein said rubber is selected from the group consisting of masticated natural rubber, masticated synthetic rubber, low molecular weight natural rubber, and low molecular weight guayule rubber.

7. A method of making acrylated chlorinated rubber comprising the steps of
   (i) reacting a solution of chlorinated hydroxyrubber in anhydrous toluene with acryloyl chloride under a nitrogen atmosphere;
   (ii) adding a solution of triethylamine in anhydrous toluene to the mixture of step (i); and
   (iii) precipitating acrylated chlorinated rubber with methanol.

8. The method of claim 7 wherein said acrylated chlorinated rubber is further purified by dissolving it in methylene chloride and precipitating it with methanol.

9. The method of claim 7 wherein said chlorinated hydroxyrubber is obtained by reacting hydroxyrubber with chlorine gas.

10. The method of claim 9 wherein said hydroxyrubber is obtained by saponification of the reaction adduct of rubber and trichloracetic acid without isolation of the adduct.

11. The method of claim 10 wherein said rubber is selected from the group consisting of masticated natural rubber, masticated synthetic rubber, low molecular weight natural rubber, and low molecular weight guayule rubber.

12. A photocurable rubber coating comprising acrylated chlorinated rubber containing acrylic ester functional groups.

13. The photocurable rubber coating according to claim 12 further comprising at least one acrylated monomer.

14. The photocurable rubber coating according to claim 13 wherein said acrylated monomer is selected from he group consisting of monofunctional, difunctional and trifunctional acrylated monomers.

15. The photocurable rubber coating according to claim 13 further comprising at least one photoinitiator.

16. The photocurable rubber coating according to claim 12 wherein said coating is 100% solids.

17. A method of making a photocurable rubber coating comprising the steps of
   (i) reacting chlorinated hydroxyrubber with acryloyl chloride in the presence of a triethylamine catalyst;
   (ii) precipitating acrylated chlorinated rubber with methanol; and
   (iii) dissolving said acrylated chlorinated rubber in a reactive diluent.

18. The method according to claim 17 wherein said reactive diluent is an acrylated monomer.

19. The method according to claim 18 wherein said acrylated monomer is selected from the group consisting of monofunctional, difunctional and trifunctional acrylated monomers.

* * * * *